July 2, 1946.  C. D. BEST  2,403,331
METHOD OF PROCESSING VEGETABLE FIBERS
Filed Aug. 26, 1943
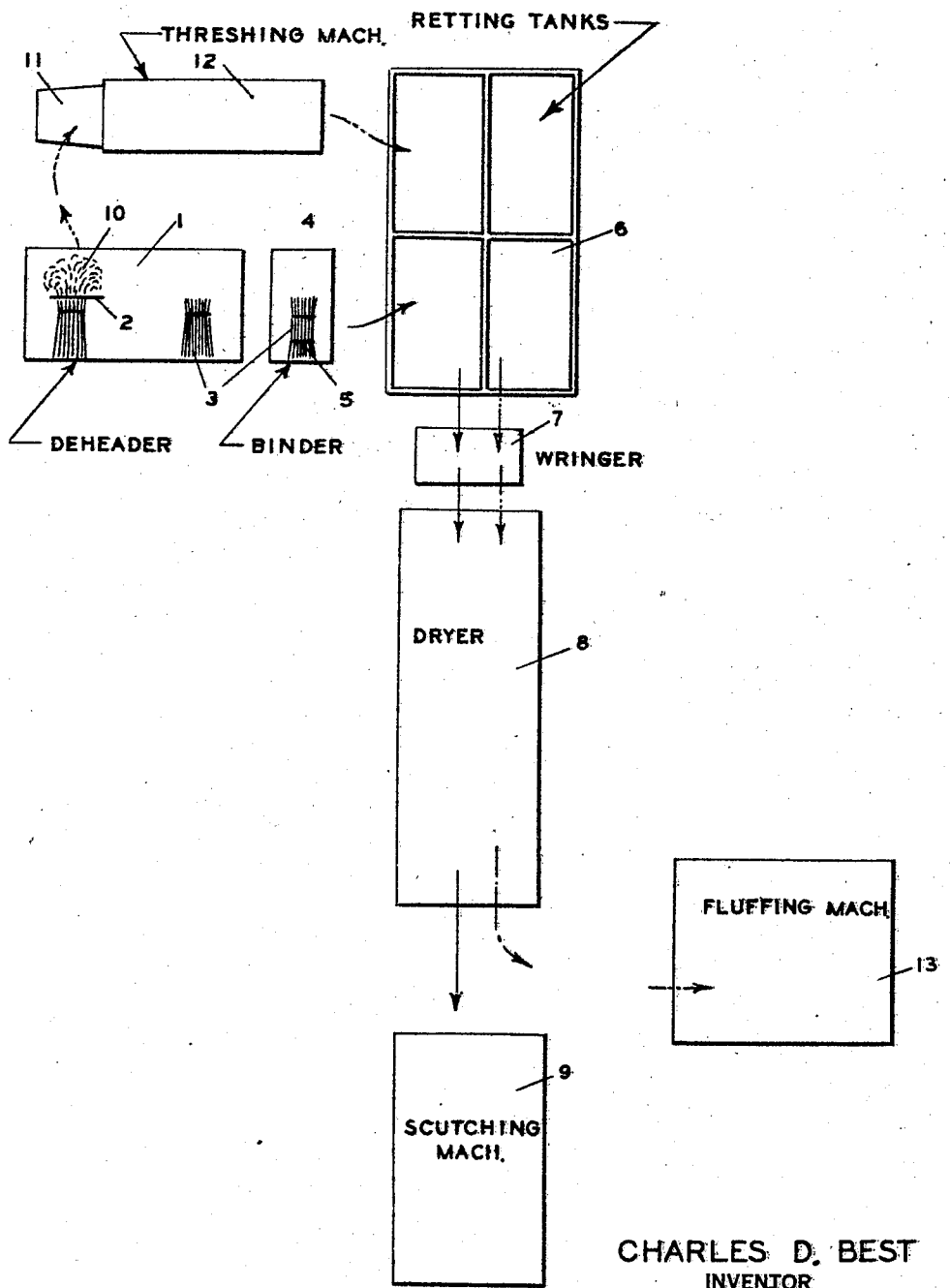
CHARLES D. BEST
INVENTOR
BY
ATTORNEY Patented July 2, 1946

2,403,331

UNITED STATES PATENT OFFICE 2,403,331

METHOD OF PROCESSING VEGETABLE FIBERS

Charles D. Best, Portland, Oreg.

Application August 26, 1943, Serial No. 500,115

1 Claim. (Cl. 19—7)

This invention relates to methods of processing vegetable fibers, particularly flax, ramie, hemp and the like.

I have discovered that the nature and consistency of the stems or stalks containing the long fibers are different from that of the heads or tops, and require a separate treatment in order to obtain most efficient results. By the processing of the heads and stems separately, the long fibers of the stalks can be processed more efficiently, producing a better grade of material for manufacturing linen and the like. At the same time, the heads or tops by being treated and handled separately, will produce a high quality spinnable product.

In the separate processing of the stalks and tops, a more complete recovery of the long fiber product is made in the scutching machines, due to the absence of the tangled heads which heretofore interfered with the scutching and combing operation. Heretofore, when the long fibers, heads and tops were left in a single unit, the scutching machine operation carried off a percentage of long fibers while removing the heads or tops. I have found that better results are obtained from the scutching of the stalks if the heads are not passed through the scutching machine.

With my method of separately processing the stalks and heads, I recover a high grade spinnable product from the heads by running them through a fluffing machine, and I also recover spinnable material from the tow remaining after the scutching of the stalks.

The heads or tops contain a gum which must be removed before a spinnable fiber can be produced. The gum is removed by a suitable degumming process. The product is then dried and run through a standard picker, then baled ready for the spinning mills.

The object of my improved method is to reduce waste in the processing of the plants and to obtain a greater percentage of spinnable product from the heads as well as from the stalks.

Another object of my improved method is to facilitate the processing of the stalks and the heads so that more efficient handling and processing of both can be obtained.

I have found that the spinnable product obtainable from the heads of the plants is quite different from that obtainable from the stalks; it is shorter and finer, requires different processing, and in the processing should not be mixed with the longer fibers from the stalks. Heretofore a considerable portion, if not all, of the material obtainable from the heads has been wasted, and the small amount which has not been wasted has been mixed with the longer stalk fibers. I have found, however, that the short fine fibers obtainable from the heads alone are valuable in themselves and have many uses without being combined with the stalk fibers.

I have illustrated my method and process in the diagrammatical drawing accompanying this specification, wherein a deheading machine is indicated at 1. This machine has a suitable device 2 for cutting the heads 10 from the stalks 3. The stalks 3 are then delivered to a binding machine 4 for adding another band 5 therearound. The purpose of this extra band is to hold the stalks in a well assembled bundle. The stalks 3 are then placed in the retting tanks 6. The retting tanks are of any well known type of design, and the retting of the stalks may be handled in much the same manner as is the custom. From the retting tanks the stalks are put through a wringer machine 7, which removes surplus moisture, although this separate wringing device may be dispensed with. The stalks are then put through a dryer 8, or they may be shocked in the field for drying in the usual manner.

When the stalks have been dried, they are put through a scutching machine 9 of any well known design. The fiber is then combed by this machine in the usual manner except that the machine can do a very effective job on these long fibers because the heads and tangled tops have been removed, thereby waste will be greatly reduced and a much better grade of long fiber will be the result due to the absence of tangled heads which heretofore interfered with the combing operation. This completes the processing of the long fiber.

I will now describe the processing of the heads or tops. The heads 10 are taken from the deheader and placed in the feeder 11 of a standard threshing machine 12, where the seeds are removed, the heads are taken by suitable means from the threshing machine to the retting tanks 6. The composition of the bacteria or chemicals used in this tank may be the same as used for the stalks or may be of a different composition for the treating of the heads or tops as the heads are of a different consistency than that of the stalks and require a special retting treatment. Thus if the same retting material is used it will be necessary to subject the heads to a longer period of retting than the stalks. However, by substituting a different material the length of time required can be reduced. This separate retting of the heads and stalks is an important feature of my new process and not only makes the processing of the long fibers more effective and efficient, but effects a recovery from the heads or tops of a spinnable product which has heretofore been treated largely as waste material but which can now be processed into a spinnable fiber of valuable quality.

When the heads have been retted, they are run through the wringer 7. They are then dried, preferably in a dryer 8, and then delivered into a fluffing machine 13, where the shives are removed from the fiber.

The next step is to degum the fiber obtained from the fluffing machine, which is a process of removing gummy material from the fibers, after which they are dried, then picked and baled. It is now classed as a number one spinnable fiber.

Finally the tow which remains after the scutching of the stalks in the scutching machine in the processing of the long fibers is run through the fluffing machine, and any fibers recoverable from this tow are mixed with the short fibers obtained from the heads. Heretofore, this tow was generally considered not worth further processing and therefore wasted. I have found that this tow, like the heads, has considerable recoverable fiber.

The term "fluffing machine," as used in this specification, is intended to include any machine capable of imparting rapid bending and shaking motions to short lengths of dried fibers for the purpose of breaking and shaking loose the shives and particles of straw, etc., from the fibers.

What I claim is:

The method of obtaining an increased amount of spinnable fibers from plants, which method comprises completely severing the heads from the stalks, subjecting the stalks to the usual treatment for obtaining fiber therefrom including the passing of the stalks through a scutching machine, collecting the tow remaining from the stalks after the long fibers have been removed from the stalks in the scutching machine, subjecting the heads to a threshing operation to remove the seeds, retting the heads, drying the retted heads, passing the heads through a "fluffing machine," passing the tow remaining from the scutching of the stalks through the "fluffing machine" and combining the fibers recovered from the tow by the "fluffing machine" with the fibers obtained from the heads in the "fluffing machine."

CHARLES D. BEST.